United States Patent [19]

Borlinghaus et al.

[11] Patent Number: 4,832,409
[45] Date of Patent: May 23, 1989

[54] RESTRAINT BELT LOAD CAPACITY FORE AND AFT POWER SEAT ADJUSTER APPARATUS

[75] Inventors: Hans J. Borlinghaus, Roseville; Michael G. Orlowsky, Sterling Heights, both of Mich.

[73] Assignee: General Motors Corporation, Detroit, Mich.

[21] Appl. No.: 93,722

[22] Filed: Sep. 8, 1987

[51] Int. Cl.$^4$ ............................................. B60R 22/26
[52] U.S. Cl. ................................... 297/468; 297/216; 297/473
[58] Field of Search ............... 297/216, 468, 472, 473; 280/804, 805; 248/423, 429, 430, 393

[56] References Cited

U.S. PATENT DOCUMENTS

| | | | |
|---|---|---|---|
| 3,186,760 | 6/1965 | Lohr et al. | 297/216 |
| 3,204,916 | 9/1965 | Pickles | 248/429 |
| 3,207,554 | 9/1965 | Dall . | |
| 3,212,828 | 10/1965 | Pickles | 308/3.8 |
| 3,524,677 | 8/1970 | Louton, Jr. | 297/216 |
| 3,727,977 | 4/1973 | Gmeiner | 297/344 |
| 3,737,197 | 6/1973 | Hall et al. . | |
| 3,758,158 | 9/1973 | Radke et al. . | |
| 4,225,184 | 9/1980 | Strowick | 297/468 |
| 4,229,041 | 10/1980 | Werner | 297/468 |
| 4,390,208 | 6/1983 | Widmer et al. | 297/379 |
| 4,508,386 | 4/1985 | Hofmann | 297/473 X |
| 4,664,351 | 5/1987 | Borlinghaus | 248/396 |
| 4,676,555 | 6/1987 | Tokugawa | 297/473 |
| 4,676,556 | 6/1987 | Yamanoi et al. | 297/473 |

FOREIGN PATENT DOCUMENTS

| | | | |
|---|---|---|---|
| 2400898 | 7/1975 | Fed. Rep. of Germany | 280/805 |
| 2084002 | 4/1982 | United Kingdom | 297/468 |

Primary Examiner—Peter R. Brown
Attorney, Agent, or Firm—Ernest E. Helms

[57] ABSTRACT

Disclosed herein is an apparatus and method of utilization thereof of a powered vehicle seat adjuster slide which can be connected with an occupant restraint belt. With use of the present apparatus, relative motion between the vehicle seat and vehicle is prevented during periods of sudden decelerations of the vehicle. The apparatus includes a connection for mounting the seat belt anchor to the slide rail, which, upon a predetermined force being applied to the seat belt, will engage a notched portion of the floor channel thereby preventing movement of the seat with respect to the floor channel.

3 Claims, 2 Drawing Sheets

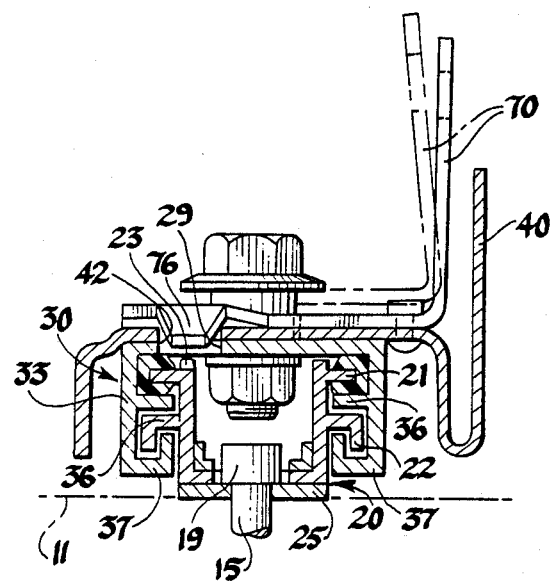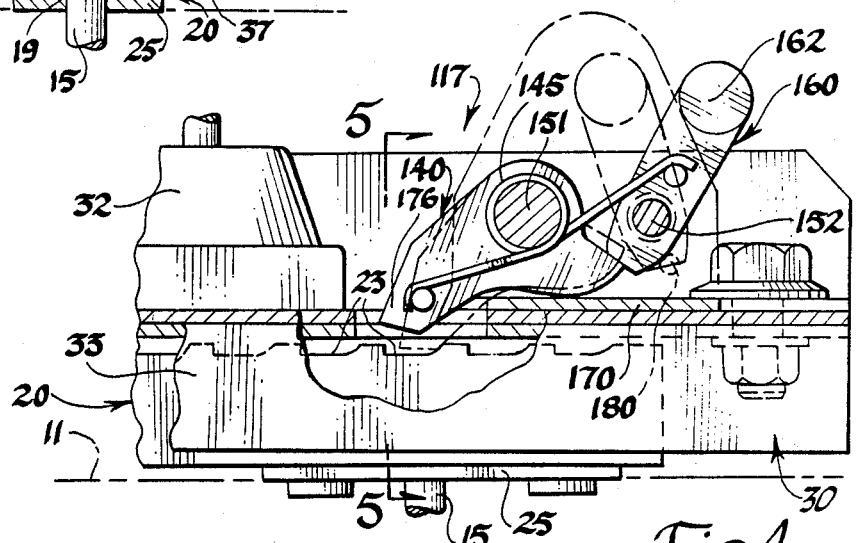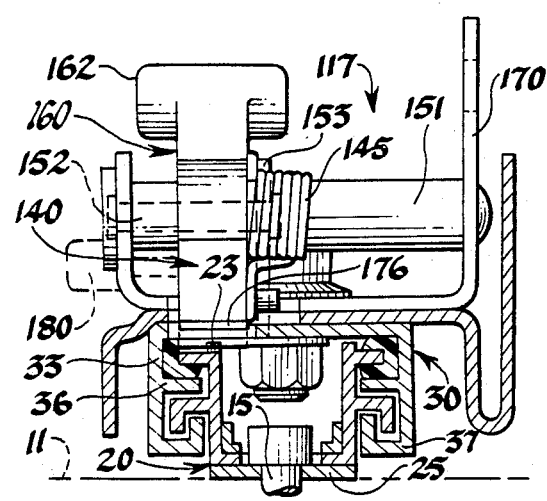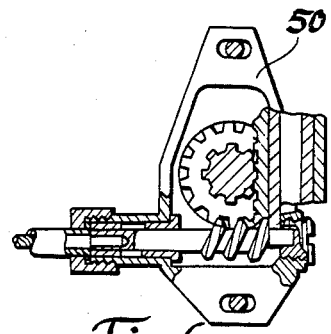

ated amount

RESTRAINT BELT LOAD CAPACITY FORE AND AFT POWER SEAT ADJUSTER APPARATUS

FIELD OF THE INVENTION

The field of the present invention is that of powered vehicle seat adjusters. More particularly, the field of the present invention is that of six-way power seat adjusters.

DISCLOSURE STATEMENT

To maximize vehicle seat occupant comfort, it has been known in the art to provide power seat adjusters capable of adjustment in six directions. Typically the adjusters have a floor or lower channel fixably connected to the vehicle and slidably mounted thereto a seat or upper channel. Excellent examples of six-way power seat adjusters are provided in March et al, U.S. Pat. No. 4,284,935, and Borlinghaus, U.S. Pat. No. 4,664,351, both commonly assigned and the disclosures of which are hereby incorporated herein. Typically, the channels of a power seat adjuster are fabricated from extruded aluminum in an interlocked design. The fore and aft horizontal actuator of the seat adjuster is designed to withstand the normal loading imposed upon the seat due to sudden decelerations of the vehicle. However, the seat adjuster typically is not designed to withstand the loading of an occupant restraint belt which can typically be in the range of 6000 pounds of force. Therefore, the occupant restraint belt is typically anchored directly to the vehicle floor.

When the vehicle seat belt is anchored to the vehicle floor, movement of the seat by the horizontal actuator can often require readjustment of the seat belt. It is desirable to provide a power seat adjuster and slide wherein the occupant seat restraint belt may be anchored to the seat adjuster directly thereby deleting the requirement of the vehicle seat occupant adjusting his vehicle seat restraint belt every time he utilizes the seat adjuster.

SUMMARY OF THE INVENTION

To meet the above noted and other desires, the present invention is brought forth. The present invention provides a powered vehicle seat adjuster having an auxiliary or secondary latch which comes into play under conditions which provide a possibility of loading upon the seat adjuster above that which can be readily restrained by the fore and aft actuator mechanism of the seat adjuster assembly.

A first embodiment of the present invention provides an anchor connected with the seat channel which under excessive loading positionally deforms to bring an integral protrusion tab into contact with a series of notches on the floor channel of the seat adjuster. An alternative embodiment of the present invention provides a locking lever which is pivotably connected with the seat channel and is held out of engagement with the notches of the floor channel by a first lever. The first lever is also pivotally connected with the seat channel and in situations of accelerations (of the vehicle seat with respect to the vehicle) of a certain predetermined value, pivots away to release the locking lever, allowing the locking lever to engage with the notches of the floor channel to lock the seat channel with the floor channel.

It is an object of the present invention to provide an apparatus and method of utilization of a powered seat adjuster (and seat adjuster slide) wherein the occupant restraint belt may be directly anchored to the seat adjuster.

It is an object of the present invention to provide a vehicle power seat adjuster slide adjustable fore and aft with an occupant restraint belt connected thereto, the seat adjuster including an elongated floor channel fixably connected with the vehicle with a flange portion, and the floor channel having a series of notches along a significant length of the floor channel, an elongated seat channel connected with the seat and slidably mounted on the floor channel with a flange portion interlocked with the flange portion of the floor channel, an actuator for selectively moving the seat channel on the floor channel and retaining the seat channel position on the floor channel under an imposed load on the seat channel up to a first predetermined amount, a restraint belt anchor providing a means for connection with the belt restraint, and the anchor having an integral tab protrusion, and primary means for connecting the belt anchor to the seat channel up to a loading on the belt restraint of a second predetermined amount under the first predetermined amount and secondary means connecting the anchor to the seat channel under an imposed load on the belt restraint of a third predetermined amount significantly exceeding the first predetermined amount whereby a restraint belt load imposed on the seat channel exceeding the first predetermined amount causes the anchor to project the protrusion tab into a position to engage with the notches of the lower channel to restrain movement of the seat channel with respect to the floor channel.

It is an object of the present invention to provide a six-way vehicle power seat adjuster with an occupant restraint belt connected thereto, the adjuster including two parallel mounted seat adjuster slides, each slide including an elongated floor channel fixably connected with the vehicle with dual flange portions, the floor channel having a series of notches along the length of the floor channel along an upper end of the floor channel, an elongated seat channel connected with the seat and slidably mounted on the floor channel with dual flange portions to interlock with the flange portions of the floor channel, the seat channel having an aperture along its upper end, a channel reinforcement plate fixably connected with the seat channel with an aperture aligned with the aperture of the seat channel, an actuator for selectively moving the seat channel on the floor channel and retaining the seat channel position on the channel under an imposed load on seat channel up to a first predetermined amount, a restraint belt anchor having forward and rearward ends, the belt restraint anchor providing an eyelet for connection of the belt restraint and the anchor having an integral tab protrusion suspended within the seat channel and floor channel apertures over the notches of the floor channel, a bolt with an enlarged flanged end, the bolt penetrating the anchor and the channel reinforcement and the bolt being fixably connected with the seat channel, and first and second rivets for connecting the rearward and the forward ends respectively of the anchor to the seat channel up to a loading on the belt restraint of a second predetermined amount causing a loading on the seat channel under the first predetermined amount and yielding under a loading on the belt restraint above the second predetermined amount and whereby a load imposed on the belt restraint causing a loading on the seat channel exceeding the first predetermined amount causes the anchor rearward end to separate from the seat channel and to cause the seat anchor to pivotally positionally deform until the anchor contacts the flange section of the bolt and the anchor engages the protrusion tab into the notches on the lower channel to restrain movement of the seat channel with respect to the floor channel.

It is an object of the present invention to provide a vehicle power seat adjuster with an occupant restraint belt connected thereto, the seat adjuster including an elongated floor channel fixably connected with the vehicle with a flange portion, and the floor channel having a series of notches along a significant length of the floor channel, an elongated seat channel connected with the seat and slidably mounted on the floor channel with a flange portion interlocked with the flange portion of the floor channel, an actuator for selectively moving the seat channel on the floor channel and retaining the seat channel position on the floor channel under an imposed load on the seat channel up to a first predetermined amount, a restraint anchor connected with the seat channel, the anchor providing a means for connection of the belt restraint, a first lever pivotally connected with the seat channel and angularly biased in a first angular direction, and a locking lever pivotally connected with the seat channel biased in an angular direction to engage with the notches of the floor channel, the locking lever being held out of engagement with the floor channel notches by the first lever whereby an acceleration of a predetermined value causes the first lever to rotate opposite the first angular direction to allow the locking lever to engage with the floor channel so that the force retaining the seat channel to the floor channel significantly exceeds the restraining force of the actuator and significantly exceeds the loading imposed on the seat channel by the belt restraint under the predetermined acceleration.

Other objects, desires and advantages of the present invention will become more apparent to those skilled in the art as the nature of the invention is better understood from the accompanying drawings and a detailed description.

BRIEF DESCRIPTION OF THE DRAWINGS

FIG. 3 is a view taken along lines 3—3 of FIG. 2;

FIG. 4 is a view similar to that of FIG. 2 of an alternative preferred embodiment of the present invention;

FIG. 5 is a view taken along lines 5—5 of FIG. 4;

FIG. 6 is a sectional view of a horizontal actuator seat adjuster of the present invention.

DETAILED DESCRIPTION OF THE DRAWINGS

Figure 1:
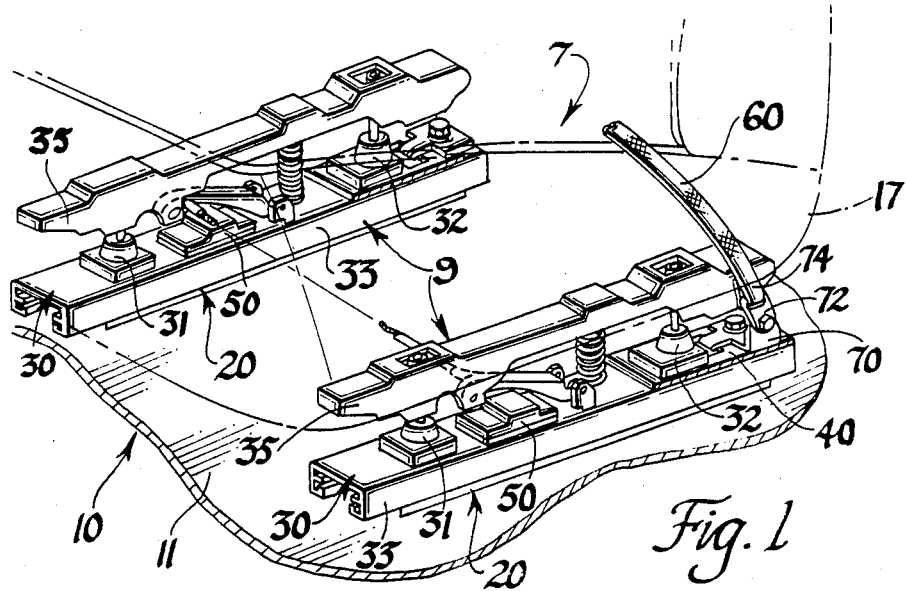
FIG. 1 is a sectional view mainly in perspective of a preferred embodiment seat adjuster slide of a typical power six-way seat adjuster according to the invention.
Figure 2:
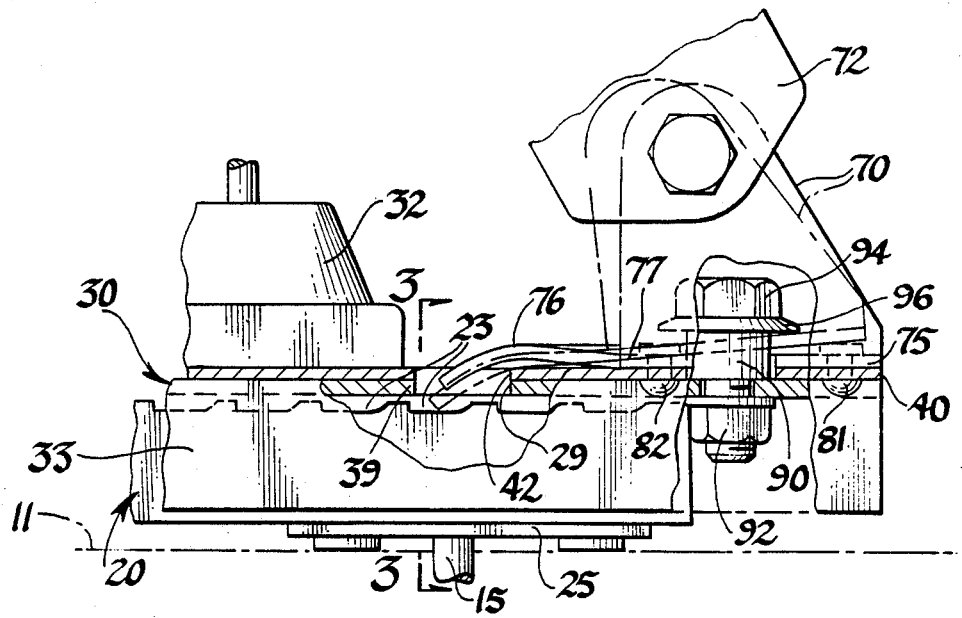
FIG. 2 is an enlarged cut away sectional view mainly in side elevation of the adjuster slide illustrated in FIG. 1.

Referring to FIGS. 1, 2 and 3, the six-way powered seat adjuster 7 of the present invention typically has two substantially identical slider assemblies 9 mounted in a parallel fore and aft fashion in the vehicle 10. Each slider 9 has an elongated floor channel 20 (sometimes referred to as a floor plate or lower channel) fixably connected to the vehicle 10. The floor channel 20 is fixably connected to the vehicle floor 11 by a series of bolts 15 which has a head 19 which sits on the riveted reinforcement plate 25 and bolts 15 project into the vehicle floor 11.

Slidably mounted on each of the floor channel 20 is a seat channel assembly 30. The seat channel assembly 30 includes an elongated seat channel 33 and front 31 and rear jack screws 32, for selectively adjusting the elevation of the front and rear portions of the seat 17 independent of one another.

The seat channel assembly 30 also has a top plate 35 allowing connection of the seat channel assembly 30 with the vehicle seat 17.

The seat channel 33 has dual flange portions 36 and 37 which interlock with the flange portions 21 and 22 of the floor channel 20. Surrounding of the flange portion 21 of the floor channel 20 is a polymeric bearing material, typically Teflon, allowing the seat channel 33 to more readily slide on top of the floor channel 20. Each seat channel 33 also has an aperture 29. Fixably connected on top of the seat channel 33 by riveting or welding or other suitable means, is a seat channel reinforcement plate 40 with an aperture 42 aligned with the aperture 29.

Referring additionally to FIG. 6, an actuator 50 is provided to selectively move position the seat channel 30 on the floor channel 20. When a sudden load is imposed in the forward direction on the seat channel 33, the actuator 50 retains the position of the seat channel with respect to the floor channel up to a first predetermined amount. The amount of restraint provided by the actuator 50 exceeds that which is required to retain the seat channel 33 (and the vehicle seat) in a set position with respect to the floor channel 20 when the vehicle undergoes an excessive deceleration. However, the retaining force of the actuator is not enough to retain the seat channel 33 in its set position with respect to the floor channel 20 under the load imposed upon the seat channel 33 by an occupant restraint belt 60 when the seat 17 is occupied.

Fixably connected to the plate 40 is a belt restraint anchor 70. The belt restraint anchor has a pivotally connected link 72 with an eyelet 74 which provides the means of connection of the occupant restraint belt 60 with the seat adjuster 7. The anchor also has integral extrusion tab 76 projecting through an apertures 29 and 42 of the seat channel 33 and plate 40. The tab 76 of the anchor 70 is adjacent to and suspended over the notches 23 of the floor channel 20.

Rearward primary end 75 and forward or secondary end 77 of the anchor has a primary means of connection with the seat channel 33 via the plate 40 by rivets 81 and 82. The anchor 70 is also connected with the seat channel by a spacer anchor bolt 90 which projects through the anchor 70 and the plate 40. The bolt is connected by a nut 92 with the seat channel 33 and retains anchor 70 within a predetermined distance of seat channel 33 by virtue of a head with an enlarged flange 96.

In operation, the sudden deceleration of the vehicle will cause a wise seat occupant who is utilizing his or her occupant restraint belt 60 to impose a described loading on seat channel 33 via the anchor 70. On a loading on the seat channel 33 of a second predetermined amount approaching but less than the first predetermined amount, the rivet 81 will yield and usually break. Rivet 82 will also tend to yield. The yielding of the rivets 81 and 82 will allow the anchor 70 to slightly pivot and to positionally deform. Anchor 70 then by contact with the flange 96 will project the tabs 76 to engage with the notches 23 of the floor channel 20. The restraining force provided by the tab 76 engagement with the notch 23 of the floor channel 20 will provide an independent secondary means of connection of the anchor 70 to the seat channel 30. The above described secondary connection means provides a restraining force far exceeding the capable restraining force of the actuator 50 or the force imposed on the seat channel 33 by virtue of the occupant restraint belt 60 loading upon the anchor 70.

FIGS. 4 and 5 provide an alternative preferred embodiment seat adjuster 117 (and slide) of the present invention. The, actuator, floor and seat channels and the seat channel reinforcement plate are substantially similar, if not identical, to those previously described in the embodiment of FIGS. 1-3. Anchor 170 has a U-shape cross section. Pivotally connected to the seat channel 33 via a pivotal connection with the anchor 170 is a weighted first lever 160. The lever 160 will typically have one enlarged portion 162 to provide a mass at an end away from the pivot point. Also pivotially connected to the seat channel 33 via the anchor 170 is a locking lever 140. The locking lever 140 is spring biased by a first coil spring 145 to a position to engage a tab 176 with the notches of the seat channel 20. The first lever 160 is also angularly biased by the spring 145 in a first (clockwise in FIG. 4) angular direction.

Shaft 151 spanning anchor 170 rotatively mounts locking lever 160 and spring 145. Shaft 152 spanning between a plate 153 and anchor 170 rotatively mounts first lever 160. The normal position of the first lever 160 makes contact with the locking lever 140 and restrains the locking lever 140 from engagement with the notches 23 of the floor channel 20. Upon a forward acceleration (of the seat with respect to the vehicle) deceleration of a predetermined value, the first lever 160 will rotate opposite the biased first angular direction thereby releasing the locking lever for engagement with the notches of the floor channel and significantly increasing the force of retention of the seat channel 33 on the floor channel 20. A block out pin 180 is provided to lock out the first lever 140 from rotating to release the locking lever 160 when the seat adjuster 117 is in transit; however, this lock out pin will be removed after installation of the seat 17 into the vehicle.

If desired, the first lever 160 and locking lever 140 can be directly connected to the seat channel 33 instead of the anchor 170.

One advantage of this embodiment is that the adjuster 117 can still be utilize after engagement at locking lever 160 by repositioning the locking lever to its prior position (so long as the seat adjuster 117 has not incurred other damage).

The present invention provides a method of restraining relative movement between a vehicle seat 17, connected with a flanged power actuated seat channel 30 which is in turn slidably mounted and interlocked with a flanged notched floor channel 20, and a vehicle connected with the floor channel, under an imposed load on the seat channel 30 by a belt restraint 72 connected with the seat channel 30 exceeding the predetermined amount of restraining force of the actuator 50, the method including the following steps:

1. Connecting with the belt restraint 72 a tabbed anchor 70 with first and second ends;
2. Suspending the anchor tab 76 over the floor channel notches 23;
3. Connecting the anchor 70 to the seat channel 30 with a second connection means 90 which will yield only under a loading significantly exceeding the first predetermined amount; and,
4. Connecting the anchor with a first means of connection 81, 82 with the seat channel 30 whereby a load imposed on the seat channel 30 by the restraint belt 72 approaching the first predetermined amount causes yielding of the first means of connection 81, 82 causing the anchor 70 to move to a position to engage the tab 76 with the floor notches 23 for restraining relative movement between the seat 17 and the vehicle.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A vehicle power seat adjusted slide adjustable fore and aft with an occupant restraint belt connected thereto, said seat adjuster in combination comprising:
   an elongated floor channel fixably connected with said vehicle with a flange portion, and said floor channel having a series of notches along a significant length of said floor channel;
   an elongated seat channel connected with said seat and slidably mounted on said floor channel with a flange portion interlocked with said flange portion of said floor channel;
   an actuator for selectively moving said seat channel on said floor channel and retaining said seat channel position of said floor channel under an imposed load on said seat channel up to a first predetermined amount;
   a restraint belt anchor providing a means for connection with said belt restraint, and said anchor having an integral tab protrusion extending outwardly from an anchor connection portion; and
   primary means for connecting said belt anchor connection portion to said seat channel up to an imposed loading on said seat channel of a second predetermined amount under said first predetermined amount by said belt restraint and secondary means adjacent to and independent of said primary connection means connecting said anchor connection portion to said seat channel to allow movement of said connection portion within a predetermined distance before being restrained by said secondary means under an imposed load on said belt restraint of a third predetermined amount significantly exceeding said first predetermined amount whereby a restraint belt load imposed on said seat channel exceeding said first predetermined amount causes said anchor to be positionally deformed said predetermined distance and to be restrained by said second connecting means and to project said protrusion tab into a position to engage with said notches of said lower channel to restrain movement of said seat channel with respect to said floor channel.

2. A six-way vehicle power seat adjuster with an occupant belt restraint connected thereto, said seat adjuster in combination comprising:
   two parallel mounted adjuster slides, each said slide including
   an elongated floor channel fixably connected with said vehicle with a double flange portion, and said floor channel having a series of notches along an upper end along a significant length of said floor channel;

an elongated seat channel connected with said seat and slidably mounted on said floor channel with dual flange portions interlocked with said flange portions of said floor channel;

an actuator for selectively moving said seat channel on said floor channel and retaining said seat channel position on said floor channel under an imposed load on said seat channel up to a first predetermined amount;

a restraint belt anchor providing an eyelet for connection with said belt restraint, and said anchor having a connection portion and an integral tab protrusion extending outwardly therefrom and adjacent said notches of said floor channel; and first and second shear rivets for connecting a rearward end and a forward end respectively of said belt anchor connection portion to said seat channel up to a loading on said belt restraint of a second predetermined amount causing an imposed load on said seat channel underneath said first predetermined amount and a second fastener adjacent to and independent of said first and second shear rivets retaining said anchor to said seat channel to allow movement of said connection portion within a predetermined distance before being restrained by said second fastener under an imposed load on said belt restraint of a third predetermined amount imposing a load on said seat channel significantly exceeding said first predetermined amount whereby a load imposed on said belt restraint causing a loading on said seat channel exceeding said first predetermined amount causes said rivets to yield and allow said anchor rearward end to separate from said seat channel within said predetermined distance and to cause said seat anchor to positionally deform to engage said protrusion tab into said notches of said lower channel to restrain movement of said seat channel with respect to said floor channel.

3. A six-way vehicle power seat adjuster with an occupant restraint belt connected thereto, said adjuster in combination comprising:

two parallel mounted seat adjuster slides, each said slide including an elongated floor channel fixably connected with said vehicle with dual flange portions, said floor channel having a series of notches along the length of said floor channel along an upper end of said floor channel;

an elongated seat channel connected with said seat and slidably mounted on said floor channel with dual flange portions interlock with said flange portions of said floor channel, said seat channel having an aperture along its upper end;

a channel reinforcement plate fixably connected with said seat channel with an aperture aligned with said aperture of said seat channel;

an actuator for selectively moving said seat channel on said floor channel and retaining said seat channel position on said channel under an imposed load on seat channel up to a first predetermined amount;

a restraint belt anchor having forward and rearward ends, said belt restraint anchor providing an eyelet for connection of said belt restraint and said anchor having an integral tab protrusion suspended within said seat channel and floor channel apertures over said notches of said floor channel;

a bolt with an enlarged flanged end, said bolt penetrating said anchor and said channel reinforcement and said bolt being fixably connected with said seat channel; and first and second rivets for connecting said rearward and said forward ends respectively of said anchor to said seat channel up to a loading on said belt restraint of a second predetermined amount causing a loading on said seat channel under said first predetermined amount and yielding under a loading on said belt restraint above said second predetermined amount and whereby a load imposed on said belt restraint causing a loading on said seat channel exceeding said first predetermined amount causes said anchor rearward end to separate from said seat channel and to cause said seat anchor to pivotally positionally deform until said anchor contacts said flange section of said bolt and said anchor engages said protrusion tab into said notches on said lower channel to restrain movement of said seat channel with respect to said floor channel.

* * * * *